Nov. 20, 1951 M. S. MANOW 2,575,499
REMOVABLE FIBRE GLASS FILTER
Filed March 10, 1949

INVENTOR
MAX S. MANOW
BY
Jerome R. Cox
ATTORNEY

Patented Nov. 20, 1951

2,575,499

UNITED STATES PATENT OFFICE 2,575,499

REMOVABLE FIBRE GLASS FILTER

Max S. Manow, Columbus, Ohio

Application March 10, 1949, Serial No. 80,650

7 Claims. (Cl. 183—49)

The inventions disclosed in this application relate to air conditioning devices and hot air heating devices and specifically to improvements in filtering devices therefor. The embodiment of my invention disclosed is associated with a casing having an air outlet opening formed with a frame. Secured to the frame is a support member, the support member being formed on one side with a grill which forms the register leading into the enclosure to be supplied with conditioned or warmed air and being provided with flanges forming a guideway into which a filter unit may be inserted for filtering of air which is circulated by said air conditioning or heating system. This filter unit may be easily removed for cleaning or replacement. Cooperating with said frame, support, grill and filtering unit is a damper plate which is designed either to open or close the passageway so that air may be circulated through said filter unit or the passageway therefor may be closed to prevent such circulation.

Prior hereto filter units have been designed and produced for cooperation with hot air heating systems and sometimes these are arranged in connection with the hot air outlet or register. Prior hereto, however, so far as I am aware none of these prior art arrangements combine the simplicity and economy of my designs nor do any of them allow the removal and replacement of the filter unit with the ease possible in my design. This ease of removal and replacement is very important inasmuch as the tendency of users otherwise is to allow the filters to remain in place even though clogged with dirt and soot with a result not only that the air becomes as dirty as it would be without the filter but also the efficiency of such heating or air conditioning system is impaired.

One of the objects of my invention therefore is the provision of a combined grill, support, filter unit, and damper of simple and economical construction which will effectively remove and collect dust and other foreign particles of dirt from the warm furnace air or the air conditioned air passing therethrough and is constructed so that the filter unit may be easily and conveniently removed and replaced and/or cleaned and returned.

A further object of my invention is the provision of a hinged support by which a filter unit may be conveniently and easily removed and replaced without the necessity for extensive mechanical work or the use of tools.

A further object of the invention is the provision of a device of this character wherein the same operates as a filter and collects dust, soot and other dirt from the air as it passes through such device, the filter being intended to be attached to and carried by a support which forms a grill for the outlet of the air casing.

A further object of my invention is the provision of means whereby the controlling means for the damper cooperates with the support and grill (by which the filter is carried) to maintain the support and grill in its closed or locked position.

A further object of this invention resides in the provision of a filtering unit conveniently and simply associated with the grill support and with a damper for controlling the passageway through and forming part of the warm air heating system, or the air conditioning system.

Further and other objects of the invention and features thereof will be apparent from the following specification and claims when considered in connection with accompanying drawings illustrating an embodiment of my invention.

Figure 1:
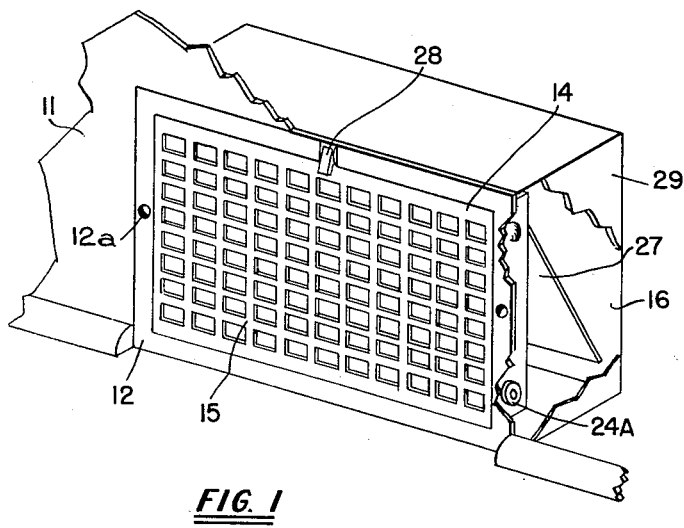
Fig. 1 is a showing of the external portion of an embodiment of my invention in perspective elevation with portions of the room wall and of a side of the heating well or casing broken away showing the grill closed and the damper open.
Figure 3:
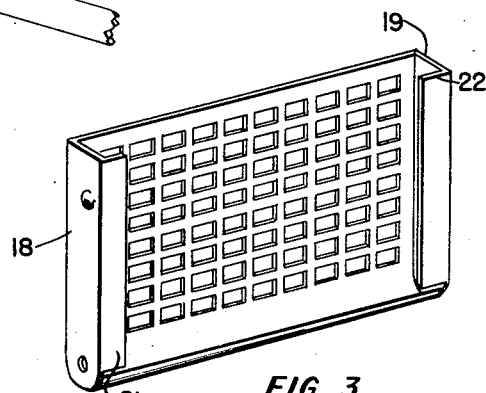
Fig. 3 is a view in perspective of the grill and support removed from the frame and showing the appearance of the support from the rear.

Referring still to the drawings for a more detailed description of the embodiment of my invention, it may be seen that I have shown a fragment of a room wall 11 in which wall a frame 12 is secured as by screws 12a. The frame 12 surrounds an opening 13 through which heated air is supplied to the enclosure to be heated.

It is to be understood that though the embodiment (shown in the drawings and described in illustration of my invention) is part of a hot air heating system yet the invention is equally applicable to an air conditioning system where the air is cooled and circulated or drawn in from outside sources and circulated or circulated for any other purposes.

It is also to be understood that though I have described and illustrated the casings as contained in the walls and the outlets as secured to the walls, the circulating ducts might be within the enclosure and in such cases and even in other cases the outlet can be directly in the duct or conduit itself instead of in the wall.

Referring however to the specific embodiment it may be seen that pivoted in this frame is a support 14 having a register or grill 15 which separates the heating well 16 from the room or enclosure to be heated. The support 14 is formed with flanges 18 and 19 having further inturned edges 21 and 22 forming a guideway in which a filter unit 23 is normally carried. The lower edge 20 is curved as shown so as to form a support at the bottom for the unit 23. The support 14 is pivoted in the frame 12 by means of a pair of bolts or rivets such as the bolt shown at 24. The support 14 is also provided with a projection or dimple 25 which at times fits into a depression 26 formed in the frame 12 and thus removably holds the support in a definite position relative to the frame 12. Pivoted to the upper part of the frame 12 is a damper 27 which is provided with a handle 28 for controlling the position of the damper. It also should be noted that the handle 28 lays over the upper portion of the support 14 and prevents opening of the support 14 and removal of the filter 23 except when the damper 27 is in its closed position, thus preventing soot and dirt from coming out into the room when the support 14 is being opened for the purpose of removing and replacing the filter unit 23.

Figure 2:
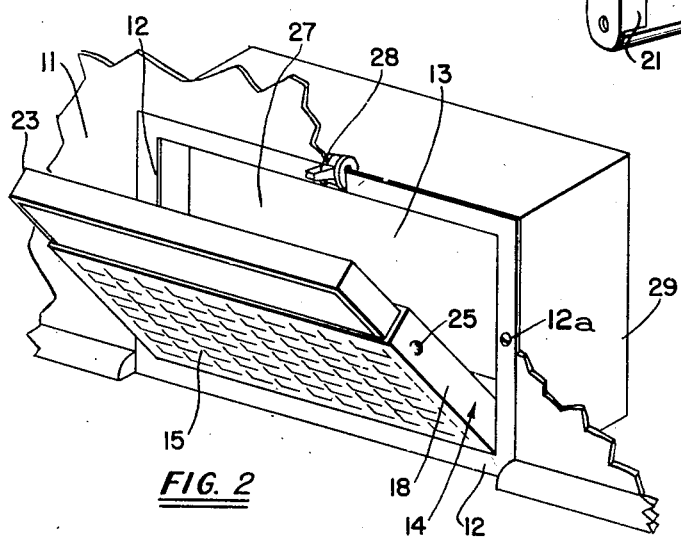
Fig. 2 is a view in perspective elevation of the register of Fig. 1 also having portions of the room wall broken away so as to show the structure more clearly and showing the grill and support in its open position and also showing the damper in its closed position.
Figure 4:
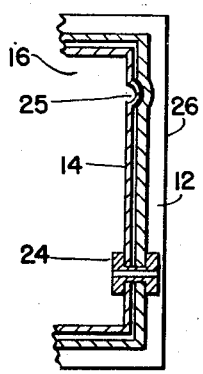
Fig. 4 is a fragmentary view in section showing the frame, the pivoted support and one of the pivots therefor as well as the locking device.

The operation of the embodiment of my invention illustrated, will, it is believed, be apparent from the above description. However, it may be reviewed as follows. With the parts in the position shown in Fig. 1 inasmuch as the damper 27 is open, the handle 28 prevents the support 14 and grill 15 from being swung on its hinges to the position of Fig. 2. Accordingly, the handle 28 is first moved upward, thus closing the damper 27. The support 14 is then swung outward to the position shown in Fig. 2. Then the filter unit 23 may be removed from the support 14 and may be replaced by a new filter unit which is inserted within the support 14. The support unit 14 may then be closed and the damper 27 returned to the position shown in Fig. 1. In such position the heating system is ready for operation. Alternatively the filter unit 23 may be cleaned and replaced within the support 14. In such case, I would prefer that the support 14 and grill 15 be returned to the position of Fig. 1 for the sake of appearances although I also prefer in such case that the damper 13 be maintained closed to prevent dirt such as dust and soot from being blown into the room. Such detail however is not material to my invention.

Although I have illustrated the support 14 as hinged within the opening 13, yet it is to be understood that it may be removably fastened therein in any other desired manner provided it is so secured that it may be easily removed therefrom for the removal, cleaning and/or replacement of the filter unit 23.

It is to be understood that the above described embodiment of my invention is for the purpose of illustration only and various changes may be made therein without departing from the spirit and scope of my invention.

I claim:

1. A filtering device for an enclosure comprising a casing of a heating well having an inlet opening and an outlet opening; a support normally positioned in said outlet opening, provided with a reticulated grill on one face thereof, and having flanges providing guideways; and a filter unit removably and slidably positioned in said guideways and fitting snugly therein so that when the support is positioned in said outlet opening, air moving through said casing passes through said grill and said filter unit into the enclosure.

2. A filtering device for an enclosure comprising a casing having an inlet opening and an outlet opening; a support normally positioned in said outlet opening, provided with a reticulated grill on one face thereof, pivotally secured to said support, and having flanges providing guideways; a damper also pivotally secured to said support; and a filter unit removably and slidably positioned in said guideways and fitting snugly therein so that when the support is positioned in said outlet opening, air moving through said casing passes through said grill and said filter unit into the enclosure.

3. A filtering device for an enclosure comprising a casing having an inlet opening and a rectangular outlet opening; a substantially rectangular support normally positioned in said rectangular outlet opening, provided with a reticulated grill on one face thereof and having flanges on a plurality of sides thereof and an opening at the top thereof which is covered by a portion of said casing when said support is positioned therein providing guideways; and a substantially rectangular filter unit positioned in said guideways and fitting snugly therein so that when the support is positioned in said outlet opening, air moving through said casing passes through said grill and said filter unit into the enclosure.

4. A filtering device for an enclosure comprising a casing having an inlet opening and a rectangular outlet opening; a substantially rectangular frame normally secured in said rectangular outlet opening and formed with a depression; a support frame pivotally secured to said rectangular frame, provided with a reticulated grill on one face thereof, having flanges on a plurality of sides thereof and having an opening on the side thereof opposite to the pivot, which opening is covered by a portion of said casing when the support frame is pivoted to its closed position providing guideways, and provided with a projection cooperating with said depression for maintaining said support releasably held within said frame; and a substantially rectangular filter unit removably and slidably positioned in said guideways and fitting snugly therein.

5. A filtering device for an enclosure comprising a casing having an inlet opening and a rectangular outlet opening; a substantially rectangular support normally positioned in said rectangular outlet opening, provided with a grill on one face thereof and having flanges providing guideways; a substantially rectangular filter unit positioned in said guideways and fitting snugly therein so that when the support is positioned in said outlet opening, air moving through said casing passes through said grill and said filter unit into the enclosure; and a damper also pivotally secured to said support and formed with a handle extending outwardly from the face of said frame which prevents outward pivotal movement of said support except when said damper is closed.

6. A filtering device for an enclosure comprising a casing having an inlet opening connected to a source of air flow and an outlet opening connected to the enclosure; a support normally positioned in said outlet opening, provided with a reticulated grill on one face thereof, and having flanges on a plurality of sides thereof providing guideways and having an opening on one side thereof, which opening is covered by a portion of said casing when the support is positioned in the outlet opening; and a filter unit removably and slidably positioned in said guideways and fitting snugly therein.

7. A filtering device for an enclosure comprising a casing having an inlet opening connected to a source of air flow and a rectangular outlet opening connected to the enclosure; a substantially rectangular support normally positioned in said rectangular outlet opening, provided with a grill on one face thereof and having flanges providing guideways; a substantially rectangular filter unit positioned in said guideways and fitting snugly therein so that when the support is positioned in said outlet opening, air moving through said casing passes through said grill and said filter unit into the enclosure; and a damper also pivotally secured to said support and formed with a handle extending outwardly from the face of said frame which prevents outward pivotal movement of said support except when said damper is closed.

MAX S. MANOW.

REFERENCES CITED

The following references are of record in the file of this patent:

UNITED STATES PATENTS

| Number | Name | Date |
| --- | --- | --- |
| 1,385,502 | Smith et al. | July 26, 1921 |
| 1,429,811 | Tynan | Sept. 19, 1922 |
| 1,968,436 | Bishop | July 31, 1934 |
| 2,158,966 | Hemming et al. | May 16, 1939 |
| 2,291,383 | Espenschied | July 28, 1942 |
| 2,404,807 | Kubatzky | July 30, 1946 |